United States Patent [19]

Whitehead

[11] Patent Number: 4,740,066
[45] Date of Patent: Apr. 26, 1988

[54] EXTERIOR REAR VIEW MIRRORS FOR VEHICLES

[75] Inventor: Peter J. Whitehead, Emsworth, England

[73] Assignee: Britax (Wingard) Limited, Chichester, England

[21] Appl. No.: 918,396

[22] Filed: Oct. 14, 1986

[30] Foreign Application Priority Data

Oct. 18, 1985 [GB] United Kingdom ............... 8525778

[51] Int. Cl.$^4$ .................... G02B 7/18; B60R 1/06
[52] U.S. Cl. ............................... 350/604; 350/631; 248/486; 248/900
[58] Field of Search ........... 350/604, 632, 606, 600, 350/635, 637; 248/475.1, 549, 900, 479, 486

[56] References Cited

FOREIGN PATENT DOCUMENTS

| 71348 | 4/1985 | Japan | 350/604 |
|---|---|---|---|
| 146743 | 8/1985 | Japan | 350/632 |
| 146742 | 8/1985 | Japan | 350/632 |
| 161230 | 8/1985 | Japan | 350/632 |
| 219138 | 11/1985 | Japan | 350/600 |
| 219139 | 11/1985 | Japan | 350/600 |
| 240540 | 11/1985 | Japan | 350/632 |
| 261744 | 12/1985 | Japan | 350/632 |

*Primary Examiner*—Jon W. Henry
*Attorney, Agent, or Firm*—Hayes, Davis & Soloway

[57] ABSTRACT

An exterior mirror for a vehicle comprises a base member attached to the vehicle body, first pivotal engagement means mounted on an arm secured to the base member so as to project laterally in the opposite direction to the mounting face, a housing for a reflective member having second pivotal engagement means. Resilient means extend between a point on the base member which is nearer to the mounting face than the pivot axis and a chain comprising a first link and a second link. The first link is pivotally attached to the base member at one end and pivotally attached to the second link at the other end, the resilient means being pivotally attached to an intermediate point on the second link. A cam surface on the second link is urged by the resilient means into engagement with a projection on the base member located between the pivot axis and the point of connection of the first link to the base member. The projection engages against an abutment at one end of the cam surface when the links are in a position such that the line of action of the spring pulls the housing towards its position of normal use, and engages in a recess at the other end thereof when the orientation of the links is such that the line of action of the spring pulls the housing towards the mounting face, e.g. as a result of impact on the housing.

3 Claims, 4 Drawing Sheets

EXTERIOR REAR VIEW MIRRORS FOR VEHICLES

This invention relates to exterior rear view mirrors for vehicles of the type which are adapted to pivot backwards against the vehicle body in the event of impact from the front and forwards against the vehicle body in the event of impact from the rear.

In the interests of both styling and aerodynamic efficiency it has become customary for the housings of mirrors of the foregoing type to be of substantial thickness in the direction of movement of the vehicle in the region where the housing abuts the vehicle body and to taper outwardly from the vehicle. Hitherto it has been customary to provide such mirrors with two vertical hinge axes, one co-incident with the front surface of the housing, about which the mirror pivots forwardly, and the other co-incident with the rear surface of the housing, about which the mirror folds rearwardly. This arrangement suffers from two disadvantages.

Firstly even when the mirror has pivoted to a position lying parallel to the side of the vehicle, its extent of projection is equal to the maximum thickness of the housing. In order to eleviate this disadvantage, the pivot axes are sometimes located at a position outboard of the vehicle where the mirror housing is thinner. The minimum projection when the mirror is in its fully pivoted position is then limited by this location of the pivot axes.

The second disadvantage is that, when a remote control mechanism is to be provided to adjust the orientation of the reflective surface within the housing, the actuating mechanism either has to go through a dislocation and relocation routine as the mirror is pivoted forwardly or backwardly and then returned to its initial position, or alternatively has to make provision for very large displacement with the associated problem of storage of excess length of cable or other linkage means during conditions of normal use.

Our United Kingdom Patent Application No. 8513552 discloses an exterior mirror of this type comprising a base member adapted to be mounted on a vehicle body, first pivotal engagement means mounted on an arm secured to the base member so as to project laterally from the vehicle body, a housing for a reflective member having second pivotal engagement means, resilient means for urging the first and second pivotal engagement means into engagement with one another so that the housing is pivotally moveable relative to the brackets about a pivot axis, the resilient means extending between a point in the interior of the housing which is further from the vehicle than the first axis when the housing is in its position of normal use and a first end of a link which has its other end pivotally attached to the base member at a point which is nearer to the vehicle than the pivot axis, the link being moveable between a first position in which the line of action of the spring pulls the housing towards its position of normal use and a second position in which the spring pulls the housing towards the mounting face.

The mirror illustrated in the above mentioned specification suffers from the disadvantage that, in order to cause the link to move back to is position of normal use, it is necessary to move the mirror housing substantially beyond such position. The present invention aims to provide an exterior mirror of the same general type in which the link returns to its first position after the housing has been moved only part of the way back towards its position of normal use.

According to the invention, an exterior mirror for a vehicle comprises a base member having a mounting face adapted to engage the vehicle body, pivotal engagement means mounted on an arm secured to the base member so as to project laterally in the opposite direction to the mounting face, a housing for a reflective member having second pivotal engagement means, resilient means for urging the first and second pivotal engagement means into engagement with one another so that the housing is pivotally moveable relative to the base member about a pivot axis, the resilient means extending between a point on the base member which is nearer to the mounting face than the pivot axis and a point in the interior of the housing which is further from the mounting face than the pivot axis when the housing is in its position of normal use, wherein the resilient means is connected to the point on the base member by a chain comprising a first link and a second link, the first link being pivotally attached to the base member at one end and pivotally attached to the second link at the other end, the resilient means being pivotally attached to an intermediate point on the second link which has a cam surface on the opposite side of said intermediate point to the point of attachment to the first link, said cam surface being arranged to be urged by the resilient means into engagement with a projection on the base member located between the pivot axis and the point of connection of the first link to the base member, and said cam surface being shaped so that said projection engages against an abutment at one end thereof when the links are in a position such that the line of action of the spring pulls the housing towards its position of normal use, and to be engaged in a recess at the other end thereof when the orientation of the links is such that the line of action of the spring pulls the housing towards the mounting face, the projection moving between said abutment and said recess as the housing moves between its first position and its second position.

An embodiment of the invention will now be described, by way of example, with reference to the accompanying drawings, in which.

Figure 1:
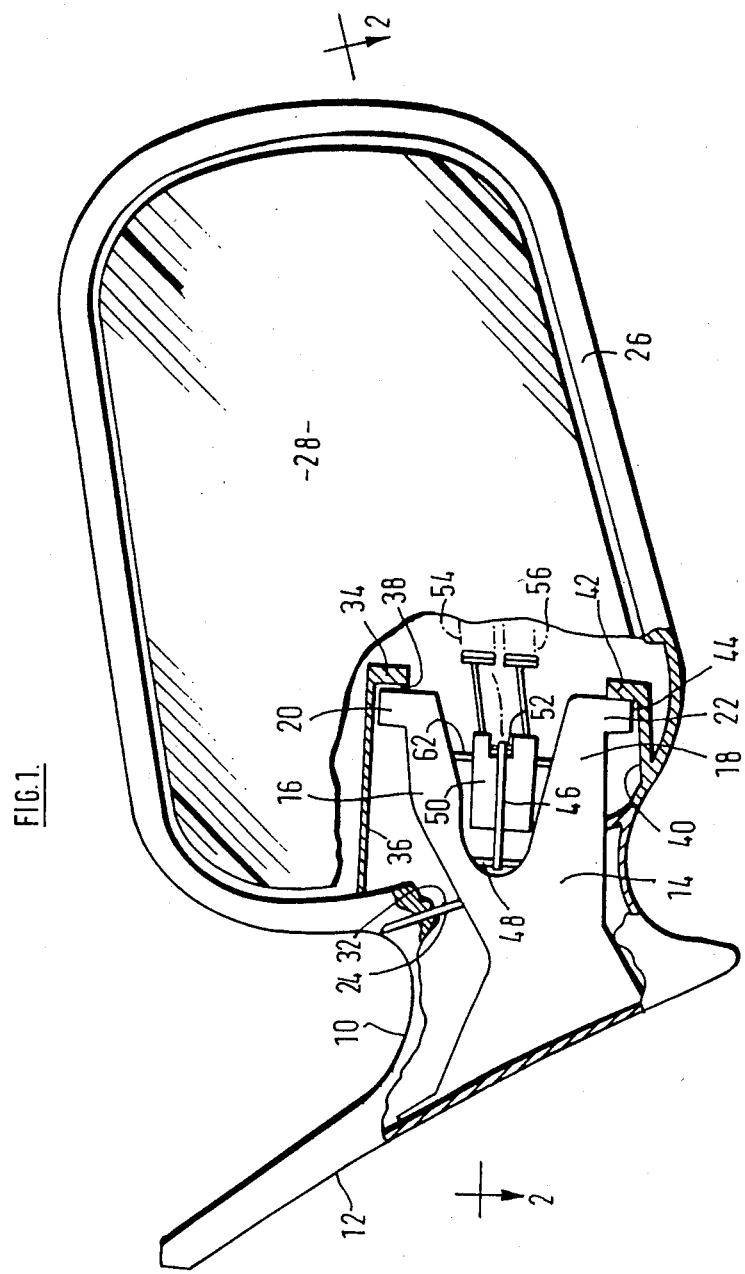
FIG. 1 is a partially broken away view from the rear of a vehicle rear view mirror in accordance with the invention, in its position of normal use.
Figure 2:
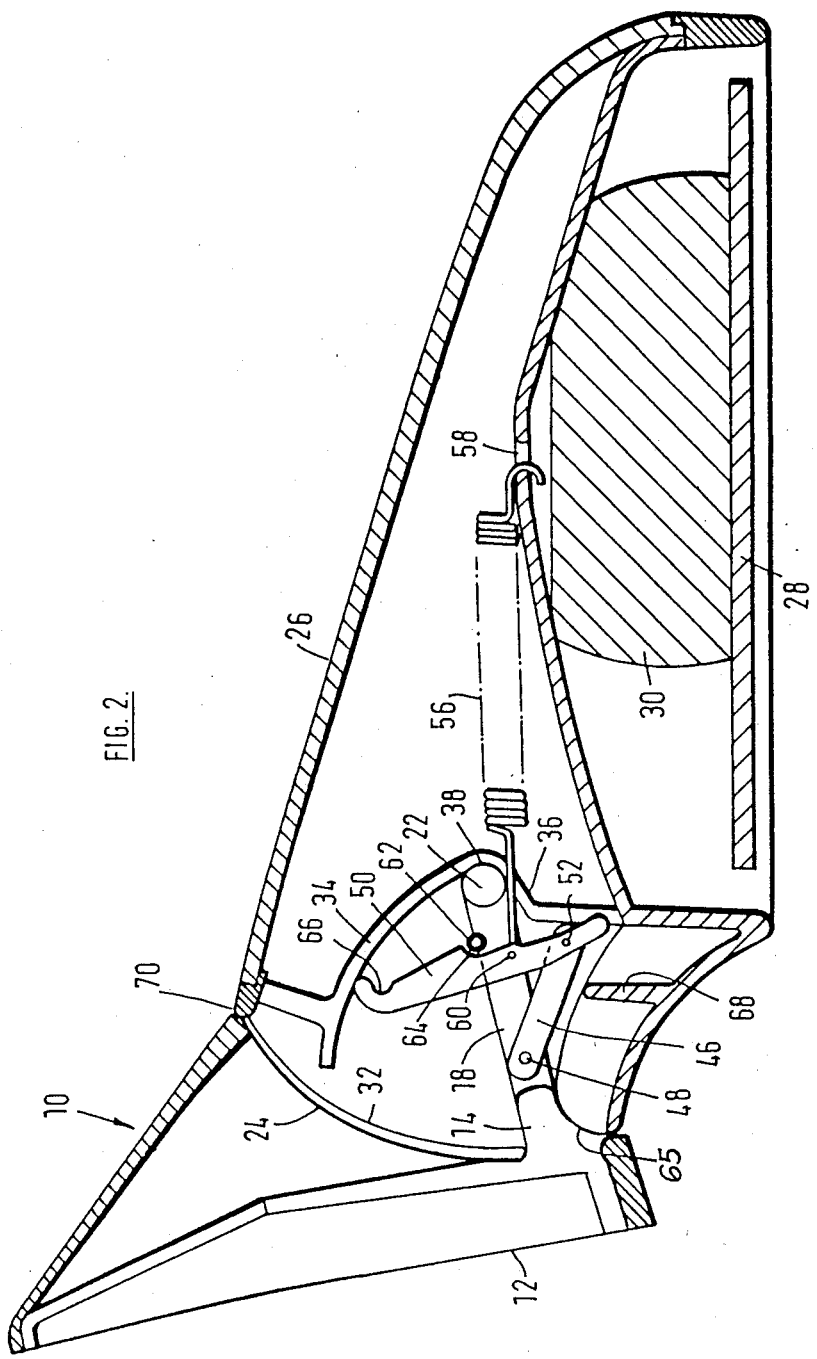
FIG. 2 is a cross-sectional view taken on the line 2—2 in FIG. 1.

Referring first to FIGS. 1 and 2, a rear view mirror comprises a hollow base member 10 having a face 12 adapted to abut against the side of the body of a motor vehicle when the mirror is mounted thereon. The base member 10 includes an outwardly projecting bifircated arm 14 having upper and lower limbs 16 and 18 each of which has a respective stub axle 20, 22 on its outer end. The stub axles 20 and 22 are aligned on a common vertical pivot axis. The outer periphery 24 of the base member is part cylindrical, centred on the pivot axis formed by the stub axles 20 and 22.

A mirror housing 26 contains a reflective member 28 mounted on means 30 (shown schematically) whereby its orientation relative to the housing 26 can be varied. The housing 26 has a cylindrical periphery 32 which abuts the periphery 24 of the base unit 10 when the housing 26 is in its position of normal use. The two abutting faces 24 and 32 are open and the arm 14 projects therethrough into the interior of the housing 26. Within the housing 26, two reinforcement members 34 and 36 abut to define a recess 38 in which the stub axle 20 is received and corresponding members 40 and 42 define a similar recess 44 for the stub axle 22.

A first link 46 is pivotally mounted on the support arm 14 by means of a pivot pin 48, and is pivotally attached to a second link 50 by a pivot pin 52. A pair of tension springs 54 and 56 extend between respective attachment points 58 within the housing 26 and attachment points 60 on the second link 50. On the opposite side of the attachment point 60 to the pivot pin 52, the second link 50 abuts against a stop pin 62 which extends between the limbs 16 and 18 of the support arm 14. When the housing 26 is in the orientation shown in FIG. 2, an abutment edge 64 on the link 50 ensures that it remains in an orientation such that the line of action of the springs 54 and 56 is on the side of the stub axles 16 and 18 nearer to the reflective member 28. The reaction force for the springs 54 and 56 is thus provided by the stub axle 20 and 22 on the one hand and engagement of the rear edge 65 of the housing 26 with the rear edge of the support arm 14 on the other, thus maintaining the housing 26 in a stable position.

Figure 3:
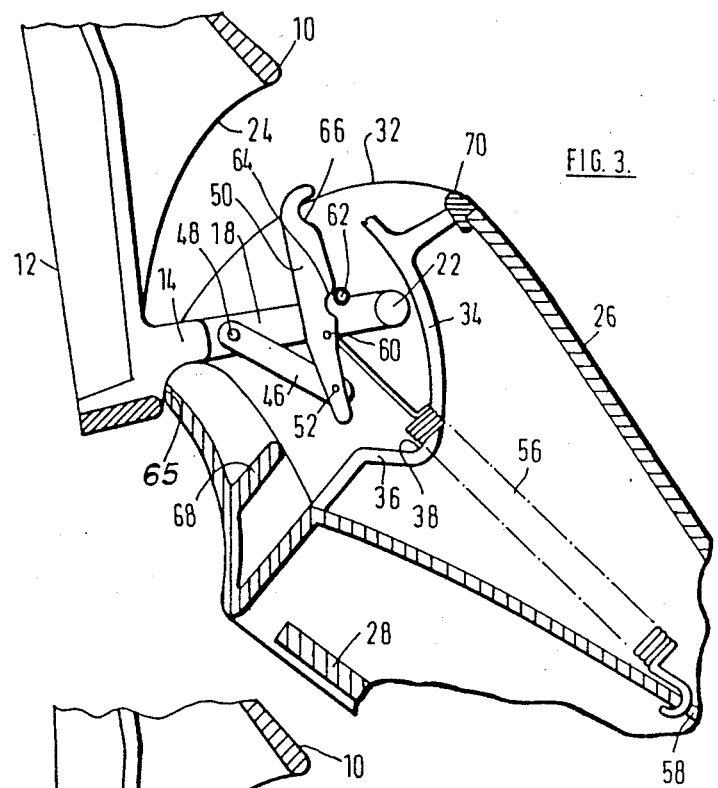
FIG. 3 is a fragmentary cross-sectional view, similar to FIG. 2, but showing the mirror housing in a partially displaced orientation after impact from the front.
Figure 4:
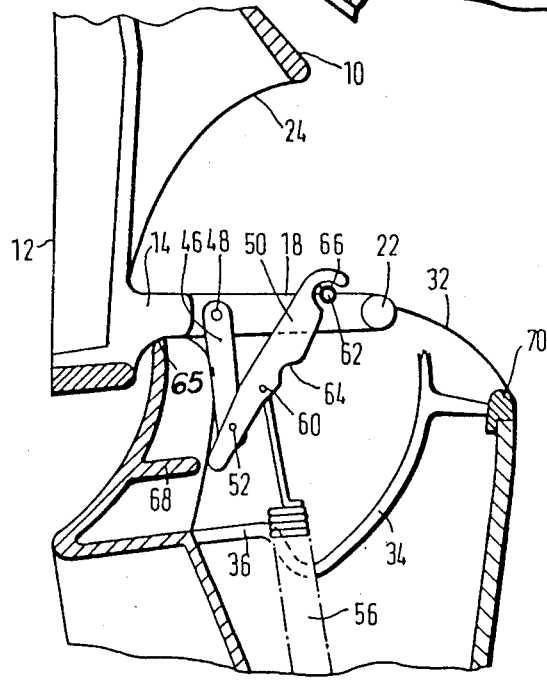
FIG. 4 is a view similar to FIG. 3 but showing the housing in its position of maximum rearward displacement.
Figure 5:
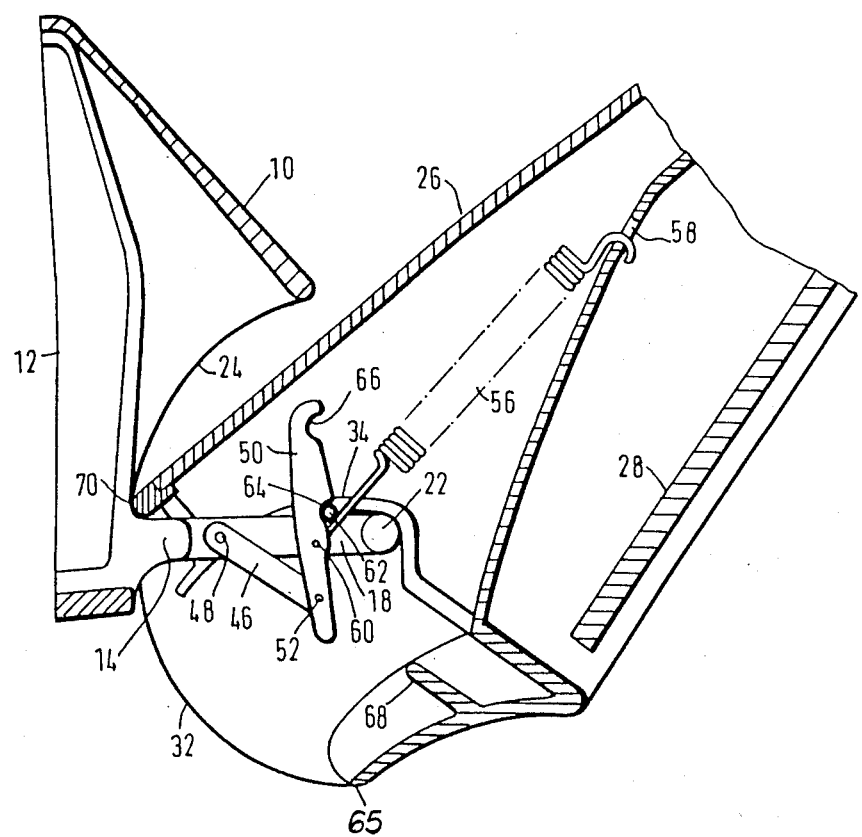
FIG. 5 is a view similar to FIGS. 3 and 4 but showing the housing in a forwardly displaced orientation following impact from behind.

Referring to FIG. 3, if the housing 26 is subject to impact from the front, i.e. from the opposite side to that from which the reflective member 28 is visible, the housing 26 pivots about the rear edge 65 of the housing 26, the pin 62 riding over the edge 64 on the link 50, due to the line of action of the springs 54 and 56 changing relative to the cam face formed by the edge 64 on the link 50. Further displacement of the housing 26 causes the pin 62 to move into a recess 66 near the end of the link 50 as shown in FIG. 4. If the force displacing the housing 26 is removed at any time before the pin 62 reaches the recess 66, the housing 26 is pulled back to the position shown in FIG. 2 by the springs 54 and 56. On the other hand, once the pin 62 has entered the recess 66, the head 26 is retained in the fully displaced position shown in FIG. 4.

As can be seen from FIG. 4, when the housing 26 is pivoted rearwardly to the maximum extent, the end of the link 50 opposite to the recess 66 abuts against a rib 68 on the interior of the housing 26. If the housing 26 is now pulled forwardly towards its original position, the rib 68 causes the link 50 to pivot on the pin 52, disengaging the recess 66 from the fixed pin 62 whereupon the links 46 and 50 snap back towards the position shown in FIG. 3 and then (assuming that further movement of the housing 26 is not obstructed) back to the original position shown in FIG. 2.

On the other hand, if when in its position of normal use, the housing 26 is subject to impact from the rear, it pivots forwardly about the stub axles 20 and 22 until the line of action of the springs 54 and 56 is in front of the stub axles 20 and 22 whereupon the housing 26 is pulled forwardly until the front edge 70 thereof abuts against the support arm 14. The housing 26 is retained in this position by the springs 54 and 56. If the housing is displaced rearwardly back towards its normal position illustrated in FIG. 2, such movement is completed by the action of the springs 54 and 56 as soon as their line of action has passed the stub axles 20 and 22.

I claim:

1. An exterior mirror for a vehicle comprising a base member having a mounting face adapted to engage the vehicle body, an arm secured to the base member so as to project laterally in the opposite direction to the mounting face, first pivotal engagement means mounted on said arm and defining a pivot axis, a housing for a reflective member, second pivotal engagement means on said housing, a first link pivotally attached at one end to a point on the base member which is nearer to the mounting face than the pivot axis, a second link pivotally attached to the first link at its other end, a projection on the base member located between the pivot axis and the point of connection of the first link to the base member, resilient means for urging the first and second pivotal engagement means into engagement with one another so that the housing is pivotally moveable relative to the base member about the pivot axis, the resilient means extending between an intermediate point on the second link and a point in the interior of the housing which is further from the mounting face than the pivot axis when the housing is in a first position of normal use, the second link having a cam surface on the opposite side of said intermediate point to its point of attachment to the first link, said cam surface being arranged to be urged by the resilient means into engagement with the projection on the base member and being shaped so that said projection engages against an abutment at one end thereof when the links are in a position such that the line of action of the spring pulls the housing towards its position of normal use, and to be engaged in a recess at the other end thereof when the orientation of the links is such that the line of action of the spring pulls the housing towards the mounting face, the projection moving between said abutment and said recess as the housing moves between said first position and a second position.

2. An exterior mirror according to claim 1, wherein a first abutment formation on the housing, and a second abutment formation on the base member closer to the mounting face than the pivot axis and arranged to engage with the first abutment formation when the projection is engaged in the recess in the cam surface, further movement of the housing from its second position further from its first position causing angular movement of the housing about a second pivot axis coincident with the point of engagement of said abutment formations, resulting in mutual disengagement of the first and second pivotal engagement means.

3. An exterior mirror according to claim 2, wherein the housing has third abutment formation and the base member has a fourth abutment formation arranged to engage with the third abutment formation when the housing is pivoted from its first position away from its second position.

* * * * *